US008885178B2

(12) United States Patent
Iwamoto

(10) Patent No.: US 8,885,178 B2
(45) Date of Patent: Nov. 11, 2014

(54) POSITION DETECTING SENSOR AND POSITION DETECTOR

(75) Inventor: Naohisa Iwamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 120 days.

(21) Appl. No.: 13/461,177

(22) Filed: May 1, 2012

(65) Prior Publication Data

US 2013/0016363 A1    Jan. 17, 2013

(30) Foreign Application Priority Data

Jul. 14, 2011   (JP) .................................. 2011-155285

(51) Int. Cl.
  *G01B 11/14*   (2006.01)
  *G06F 3/044*   (2006.01)
  *G06F 3/046*   (2006.01)

(52) U.S. Cl.
  CPC ................ *G06F 3/044* (2013.01); *G06F 3/046* (2013.01)
  USPC ........................................................ 356/616

(58) Field of Classification Search
  USPC ........................................................ 356/616
  See application file for complete search history.

(56) References Cited

U.S. PATENT DOCUMENTS

| 2009/0273577 | A1 | 11/2009 | Chen et al. | |
|---|---|---|---|---|
| 2010/0321313 | A1 | 12/2010 | Oda et al. | |
| 2010/0321314 | A1 | 12/2010 | Oda et al. | |
| 2010/0321315 | A1 | 12/2010 | Oda et al. | |
| 2010/0328228 | A1* | 12/2010 | Elias | 345/173 |
| 2012/0236402 | A1* | 9/2012 | Ohyama | 359/462 |

FOREIGN PATENT DOCUMENTS

| JP | 2009009249 A | 1/2009 |
|---|---|---|
| JP | 2011003035 A | 1/2011 |

* cited by examiner

*Primary Examiner* — Tarifur Chowdhury
*Assistant Examiner* — Omar Nixon
(74) *Attorney, Agent, or Firm* — Seed IP Law Group PLLC

(57) ABSTRACT

A position detecting sensor includes a grid structure composed of plural electrodes extending in a first direction and plural electrodes extending in a second direction perpendicular to the first direction. The electrodes have light permeability. In a rectangular area defined by four cross-points, where two adjacent electrodes extending in the first direction and two adjacent electrodes extending in the second direction cross each other, a dummy pattern is disposed so as to provide uniform optical characteristics for the sensor. At least some of the electrodes extending in the first direction are shaped to include inclinations relative to the first direction, so as to minimize the Moire effect that may develop between the electrodes and an array of pixels in an overlaid display device. Also, at least some of the electrodes extending in the first direction are shaped to be line-symmetric about a straight line extending in the first direction.

20 Claims, 8 Drawing Sheets

POSITION DETECTING SENSOR AND POSITION DETECTOR

CROSS-REFERENCE TO RELATED APPLICATION

The present application claims priority under 35 U.S.C. 119(a) of Japanese Application No. 2011-155285, filed Jul. 14, 2011, the entire content of which is incorporated herein by reference.

BACKGROUND

1. Technical Field

The present invention relates to a position detecting sensor, which is disposed so as to be superposed on a display surface of a display device such as a Liquid Crystal Display (LCD) device or the like, in order to detect a position where an input manipulation is carried out by an indication body, and a position detector that incorporates such position detecting sensor.

2. Description of the Related Art

A position detector for detecting a position indicated by an indication body, such as a finger or a pen, is well known. Various types of position detecting systems may be used in the position detector, such as a resistance film system, an electromagnetic induction system, and a capacitive system. The capacitive system includes two sub-types: a Surface Capacitive Type; and a Projected Capacitive Type. With both the Surface Capacitive Type and the Projected Capacitive Type, a change in a capacitive coupling state between a sensor electrode and an indication body is detected, to thereby detect a position indicated by the indication body.

For example, Patent Document 1 (Japanese Patent Laid-Open No. 2009-9249) discloses a position detector utilizing the capacitive system and having a construction including a two-dimensional capacitive sensor, that is, a construction including an X-axis sensor trace (sensor conductor) and a Y-axis sensor trace (sensor conductor). The X-axis sensor trace and the Y-axis sensor trace, each composed of a light-permeable transparent conductor, are formed on a light-permeable base member, for example, a transparent substrate such as a glass plate. Such construction is based on the assumption that the sensor of the position detector disclosed in Patent Document 1 is disposed so as to be superposed on a display surface of a display device.

For the purpose of detecting a position in an X-axis direction (in a transverse direction), the X-axis sensor traces (each extending in the Y-axis direction) are provided at predetermined intervals in the X-axis direction on the transparent substrate. Also, the X-axis sensor traces have such a shape that plural diamond-shaped transparent conductors are continuously connected to one another in the Y-axis direction (in the longitudinal direction). In addition, for the purpose of detecting a position in the Y-axis direction, the Y-axis sensor traces (each extending in the X-axis direction) are disposed at predetermined intervals in the Y-axis direction on the transparent substrate. The Y-axis sensor traces have such a shape that plural diamond-shaped transparent conductors are continuously connected to one another in the X-axis direction.

The diamond-shaped conductors of the X-axis sensor traces and the diamond-shaped conductors of the Y-axis sensor traces do not overlap each other, and the X-axis sensor traces and the Y-axis sensor traces are combined with each other in a state of being electrically independent of each other, whereby a two-dimensional capacitive sensor is constructed on the transparent substrate. Therefore, the two-dimensional capacitive sensor comes to have a pattern shape, in which the diamond-shaped transparent conductors are uniformly disposed on the transparent substrate. As a result, approximately uniform light permeability can be obtained over the entire transparent substrate.

The two-dimensional capacitive sensor disclosed in Patent Document 1 is a sensor utilizing a so-called line detection system, with which a change in capacitance in any of the plural X-axis sensor traces is detected to thereby detect a position of a finger or a position indicator in the X-axis direction, and a change in capacitance in any of the plural Y-axis sensor traces is detected to thereby detect a position of the finger or the position indicator in the Y-axis direction.

On the other hand, another position detector is proposed, which utilizes a system called a cross-point capacitive system, which has been developed based on the projected capacitive system. FIG. 9 shows a schematic structure surrounding a sensor portion of the position detector utilizing the cross-point capacitive system.

As shown in FIG. 9, the sensor portion of the position detector utilizing the cross-point capacitive system is constructed in such a way that plural upper electrodes Ex each extending, for example, in a Y-axis direction (in a longitudinal direction) on an indication input surface and plural lower electrodes Ey each extending in an X-axis direction (in a transverse direction) are disposed at predetermined intervals in the X-axis direction and in the Y-axis direction, respectively, so as to form right angles with each other with a slight space provided therebetween. In this case, predetermined capacitance Co (fixed capacitance) is formed at a position (at a cross-point), at which each upper electrode Ex and the corresponding lower electrode Ey intersect with each other.

At a position where an indication body 100, such as a position indicator held by a user or a finger of the user, comes close to or in contact with an indication input surface, capacitance Cf is formed between the indication body and the electrodes Ex and Ey corresponding to the position. The indication body 100 is electrically connected through the user's body to the ground via predetermined capacitance Cg. As a result, due to the presence of both of the capacitances Cf and Cg, the shifting amount of electric charge between the upper electrode Ex and the lower electrode Ey is changed at the position indicated (pointed to) by the indication body 100. With the position detector utilizing the cross-point capacitive system, the change in the shifting amount of electric charge is detected, to thereby specify the position within the indication input surface indicated by the indication body 100.

For example, the lower electrode Ey is used as a transmission electrode and a predetermined signal is supplied to the lower electrode Ey, and the upper electrode Ex is used as a reception electrode. Then, a change in current in a received signal from the reception electrode is detected, to thereby detect the change in the shifting amount of electric charge.

When the position detector utilizing the cross-point capacitive system is disposed so as to be superposed on a display surface of an LCD, an organic EL display device or the like, the upper electrode Ex and the lower electrode Ey are formed in such a way that conductive patterns each having a given width and light permeability and, for example, composed of an Indium Tin Oxide (ITO) film extend in the Y-axis direction and in the X-axis direction, respectively, and are disposed on a surface of a light-permeable base member, for example, a transparent glass substrate or the like.

In this case, unlike the line detection system sensor disclosed in Patent Document 1 described above, in the position detecting sensor utilizing the cross-point capacitive system, areas exist in which no light-permeable electrode is formed, in rectangular areas defined by two adjacent upper electrodes Ex and two adjacent lower electrodes Ey. For this reason, since the area in which no light-permeable electrode is formed is different in light permeability from a portion in which the light-permeable conductive pattern is formed, it becomes difficult to obtain uniform light permeability over the entire sensor area (for the purpose of ease in viewing the display surface).

In order to solve this problem, a sensor utilizing a cross-point capacitive system is disclosed in paragraphs [0115] to [0120], and FIGS. 18 and 19 of Patent Document 2 (Japanese Patent Laid-Open No. 2011-3035), in which a dummy pattern 114 made of a light-permeable material, for example, the same ITO film as used to form each of the upper electrodes 110 and lower electrodes 112, is disposed in a rectangular area surrounded by the adjacent upper electrodes 110 and the adjacent lower electrodes 112. In this case, the dummy pattern 114 is electrically independent of any of the upper electrodes 110 and the lower electrodes 112, and is in an electrically floating state (in a floating state). According to the position detecting sensor disclosed in Patent Document 2, due to the presence of the dummy pattern disposed close to each of the upper electrode 110 and the corresponding lower electrode 112, it is possible to achieve uniform optical characteristics by suppressing non-uniformity of transmittance.

In the position detecting sensor utilizing the cross-point capacitive system as described above, plural upper electrodes and plural lower electrodes are disposed linearly in the X-axis direction (in the transverse direction) and in the Y-axis direction (in the longitudinal direction), respectively, to cross each other at right angles on the light-permeable substrate, to thereby form a sensor pattern having a so-called grid pattern. For the purpose of obtaining uniform light permeability over the entire sensor area, dummy patterns are provided in the individual areas defined by the plural upper electrodes and the plural lower electrodes, with a predetermined space provided between the dummy pattern and each of the upper electrodes and the lower electrodes.

For this reason, when the position detecting sensor is disposed so as to be superposed on the screen of the display device such as the LCD, possibly a so-called Moire effect may result between display pixels disposed in the X-axis direction (in the transverse direction) and in the Y-axis direction (in the longitudinal direction) in the display device concerned, and the upper electrodes, the lower electrodes and the dummy patterns, and thus light-and-dark Moire fringes (or simply Moire) may be generated in a displayed image.

Patent Document 3 (U.S. Published Application No. 2009/0273577A1) discloses the invention that can either decrease or prevent the Moire effect between the sensor electrodes of a position detector and the pixel disposition in a display device.

Specifically, as shown in FIG. 10, in a display surface of a display device 602, sub-pixels R, G, and B (corresponding to the three primary colors: red; green; and blue) are repetitively disposed in order in the X-axis direction (in the transverse direction). The disposition in the X-axis direction is also repeated in the Y-axis direction (in the longitudinal direction), whereby display pixels are two-dimensionally disposed. In this case, the sub-pixels corresponding to the same color are disposed in a line in the Y-axis direction, and thus it is known that the Moire effect may easily result between the disposition of the pixels in the Y-axis direction, and the electrodes in the Y-axis direction in the position detecting sensor.

Patent Document 3 discloses a position detecting sensor 600, which is superposed on the display surface of the display device 602 and includes a transmission electrode 604 and a reception electrode 618. As shown in FIG. 10, in an electrode 618 in the Y-axis direction of the position detecting sensor 600, a transparent conductor having a given width is formed so as to have a bent shape (zigzag shape) with a predetermined inclination with respect to the Y-axis direction. As a result, in Patent Document 3, it is possible to either decrease or prevent the Moire effect between the disposition of the pixels in the Y-axis direction, and the electrodes in the Y-axis direction of the position detecting sensor.

PRIOR ART DOCUMENTS

Patent Document 1
  Japanese Patent Laid-Open No. 2009-9249
Patent Document 2
  Japanese Patent Laid-Open No. 2011-3035
Patent Document 3
  U.S. Published Application No. 2009/0273577A1

BRIEF SUMMARY

Problems to be Solved by the Invention

In the position detecting sensor disclosed in Patent Document 3, to address the issue of the Moire effect, an electrode having a given width is formed so as to have a bent shape or a wave-like shape of a curved line. On the other hand, in the position detecting sensor utilizing the cross-point capacitive system, it is desirable to form electrodes in straight lines in both the X-axis direction and the Y-axis direction that form cross-points, for ease of position detection calculation operation. However, in the position detecting sensor disclosed in Patent Document 3, the cross-points are located at positions corresponding to the bent shape or the curved-line shape of the reception electrodes 618, and thus are not located on straight lines.

Specifically, the shape defined by four cross-points, which are defined by two adjacent transmission electrodes 604 in the X-axis direction and two adjacent reception electrodes 618 in the Y-axis direction, is preferably a rectangle for ease of position detection calculation operation. However, in the position detecting sensor disclosed in Patent Document 3, the shape defined by the four cross-points is not a rectangle. Therefore, in the case of the position detecting sensor disclosed in Patent Document 3, during position detection, it is necessary to execute signal correction processing to correct a detected position, which results in a complicated configuration of the position detector.

According to one aspect of the present invention, a position detecting sensor is provided, which is capable of solving the problems described above.

Means for Solving the Problems

In order to solve the problems described above, the invention according to an exemplary embodiment provides a position detecting sensor configured to be superposed on a display surface of a display device including plural pixels disposed in a first direction and in a second direction perpendicular to the first direction. The position detecting sensor is configured to detect a position indicated thereon by an indication body.

The position detecting sensor includes a grid structure composed of plural electrodes extending in the first direction and each having light permeability, and of plural electrodes extending in the second direction and each having light permeability. In the grid structure, a rectangular area is formed by four cross-points at which two adjacent electrodes extending in the first direction and two adjacent electrodes extending in the second direction intersect with each other. As used in the present description, an electrode extending in the first direction means an elongate electrode that extends in the first direction or in a direction parallel to the first direction. Similarly, an electrode extending in the second direction means an elongate electrode that extends in the second direction or in a direction parallel to the second direction.

A dummy pattern having light permeability is disposed in a portion within the rectangular area, in which none of the electrodes is formed, so as to be proximate to the electrodes formed in the rectangular area to thereby provide uniform optical characteristics for the position detecting sensor. The dummy pattern is disposed to electrically float.

According to the exemplary embodiment, at least some of the plural electrodes extending in the first direction are shaped to have determined inclinations with respect to the first direction between two adjacent cross-points disposed in the first direction, so as to reduce a Moire effect between the plural pixels disposed in the first direction and the plural electrodes extending in the first direction. Further, at least some of the plural electrodes extending in the first direction are each shaped to be line-symmetric about a straight line extending in the first direction.

In the invention according to the embodiment described above, the plural electrodes extending in the first direction and each having light permeability are shaped to have determined inclinations with respect to the first direction, whereby it is possible to reduce or prevent the generation of the Moire fringes between the plural pixels disposed in the first direction and the plural electrodes.

In addition, the structure is adopted such that the area defined by the four cross-points, at which two adjacent electrodes disposed in the first direction and two adjacent electrodes disposed in the second direction intersect with each other, forms a rectangle. Therefore, although the inclinations measures to reduce the Moire effect are taken, the cross-points of the position detecting sensor remain disposed on straight lines in the first direction and in the second direction, respectively. Accordingly, it is unnecessary to execute signal processing required to correct a detected position based on an indicated position.

In addition, the plural electrodes extending in the first direction have a shape which is line-symmetric about a straight line in the first direction. Specifically, a central line in the first direction that connects midpoints of the widths extending in the second direction of the electrode extending in the first direction becomes the axis of line-symmetry for the electrode extending in the first direction. The central line is set as a straight line parallel with the first direction. Therefore, in the present invention, it is unnecessary to execute signal correcting processing required for correcting a detected position, and thus a position indicated by the indication body can be precisely detected.

Effects of the Invention

According to the position detecting sensor of the present invention, the dummy patterns are disposed in the sensor pattern having a grid structure, whereby uniform light permeability can be ensured over the entire sensor area. In addition, when the position detecting sensor is superposed on the display surface of a display device, it is possible to either decrease or prevent generation of the Moire fringes, due to the disposition of the dummy patterns, between the pixel disposition in the display surface and the position detecting sensor.

Moreover, a position indicated by the indication body can be precisely detected without any correction processing in the signal processing circuit.

DETAILED DESCRIPTION

Hereinafter, embodiments of a position detector and a position detecting sensor included in the position detector will be described in detail with reference to the accompanying drawings.

First Embodiment

Figure 1:
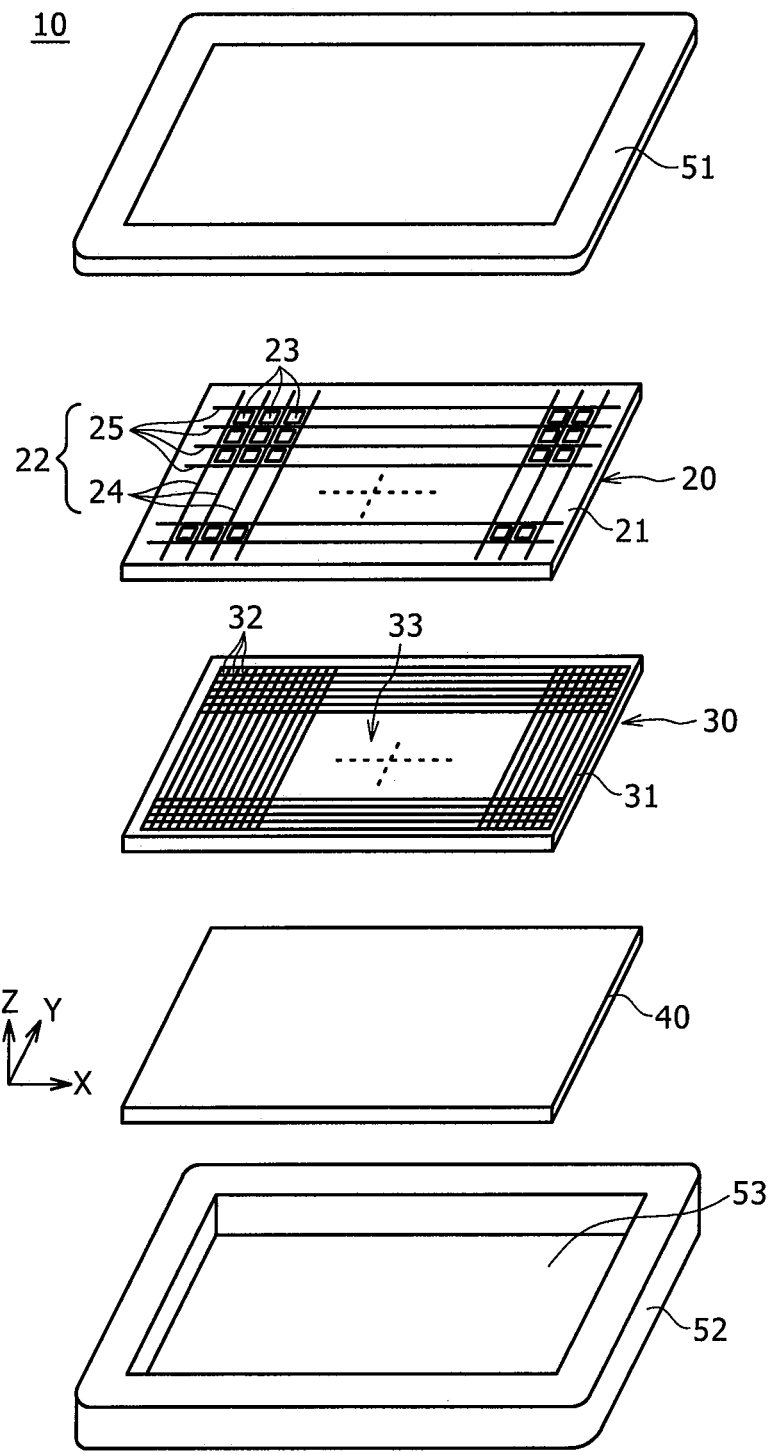
FIG. 1 is an exploded view of an example of a position detector including a first embodiment of a position detecting sensor according to the present invention.

FIG. 1 is an exploded perspective view showing an example of a position detector including a first embodiment of a position detecting sensor according to the present invention. The example shown in FIG. 1 illustrates a construction of a tablet device, including a position detecting sensor for detecting a position on a display surface of a display device indicated by, for example, a pen (stylus).

The tablet device 10 of the example, as shown in FIG. 1, is composed of the position detecting sensor 20, a Liquid Crystal Display (LCD) device 30 as an example of the display device, a printed wiring board 40, and an upper case 51 and a lower case 52 that form a chassis of the tablet device 10.

As shown in FIG. 1, the LCD 30 includes a display surface 33, on which a large number of display pixels 32 are disposed in the X-axis direction (in a transverse or horizontal direction) on an LCD substrate 31, and a large number of display pixels 32 are also disposed in the Y-axis direction (in a longitudinal or vertical direction) crossing at right angles with the X-axis direction on the LCD substrate 31. The position detecting sensor 20 is disposed so as to be superposed on the display surface 33 of the LCD 30.

The position detecting sensor 20, in this example, adopts a construction of a sensor utilizing a cross-point capacitive system. In this example, the position detecting sensor 20 is constructed in such a way that a transparent electrode group 22 composed of plural electrodes each having light permeability is formed on one surface (a surface on a side opposite to a surface facing the display surface 33 of the LCD 30) of a transparent substrate 21. Also disposed on the display surface 33 are dummy patterns 23 each having predetermined light permeability. The transparent substrate 21 is composed, for example, of a glass substrate.

The transparent electrode group 22 is composed of plural first transparent electrodes 24 disposed so as to each extend in the Y-axis direction, and plural second transparent electrodes 25 disposed so as to each extend in the X-axis direction crossing at right angles with the Y-axis direction. The first transparent electrodes 24 are disposed at predetermined intervals in the X-axis direction. The second transparent electrodes 25 are disposed at predetermined intervals in the Y-axis direction. Each of the first transparent electrodes 24 and the second transparent electrodes 25 is composed of a conductor made of a light-permeable conductive material, for example, of an ITO film.

The first transparent electrodes 24 and the second transparent electrodes 25, in this example, are formed on the same one surface side of the transparent substrate 21. For this reason, at each of the cross-points where the first transparent electrodes 24 and the second transparent electrodes 25 intersect each other at right angles, an insulating material is disposed between each of the first transparent electrodes 24 and the corresponding second transparent electrode 25, whereby the first transparent electrodes 24 and the second transparent electrodes 25 are electrically insulated from each other. A detailed structure of the insulation between the first transparent electrodes 24 and the second transparent electrodes 25 in the area of the cross-point will be described later.

The dummy pattern 23 is provided in an area surrounded by two adjacent first transparent electrodes 24 and two adjacent second transparent electrodes 25. The dummy pattern 23 is provided to equalize the light transmittance of an area, in which none of the first transparent electrode 24 and the second transparent electrode 25 is formed, with that of an area in which the first transparent electrode 24 and the second transparent electrode 25 are formed, to thereby attain uniform optical characteristics for the sensor substrate.

Therefore, the dummy pattern 23 should only be made of a material having a transmittance which is identical or comparable to that of each of the first transparent electrode 24 and the second transparent electrode 25, and thus the dummy pattern 23 needs not to be composed of a conductive member. In the first embodiment, however, the dummy pattern 23 is also composed of an ITO film used as the material for forming each of the first transparent electrode 24 and the second transparent electrode 25, in consideration of uniformity of the light transmittance and ease of manufacturing the position detecting sensor 20.

For this reason, in the first embodiment, for the purpose of maintaining the preferable optical performance for the position detecting sensor 20, the dummy pattern 23 is disposed with a predetermined space provided from each of the first transparent electrodes 24 and the second transparent electrodes 25, and is electrically independent of each of the first transparent electrodes 24 and the second transparent electrodes 25. Also, the dummy pattern 23 provided in the area surrounded by the first transparent electrodes 24 and the corresponding second transparent electrodes 25 is held in an electrically floating state (in a floating state).

Figure 2:
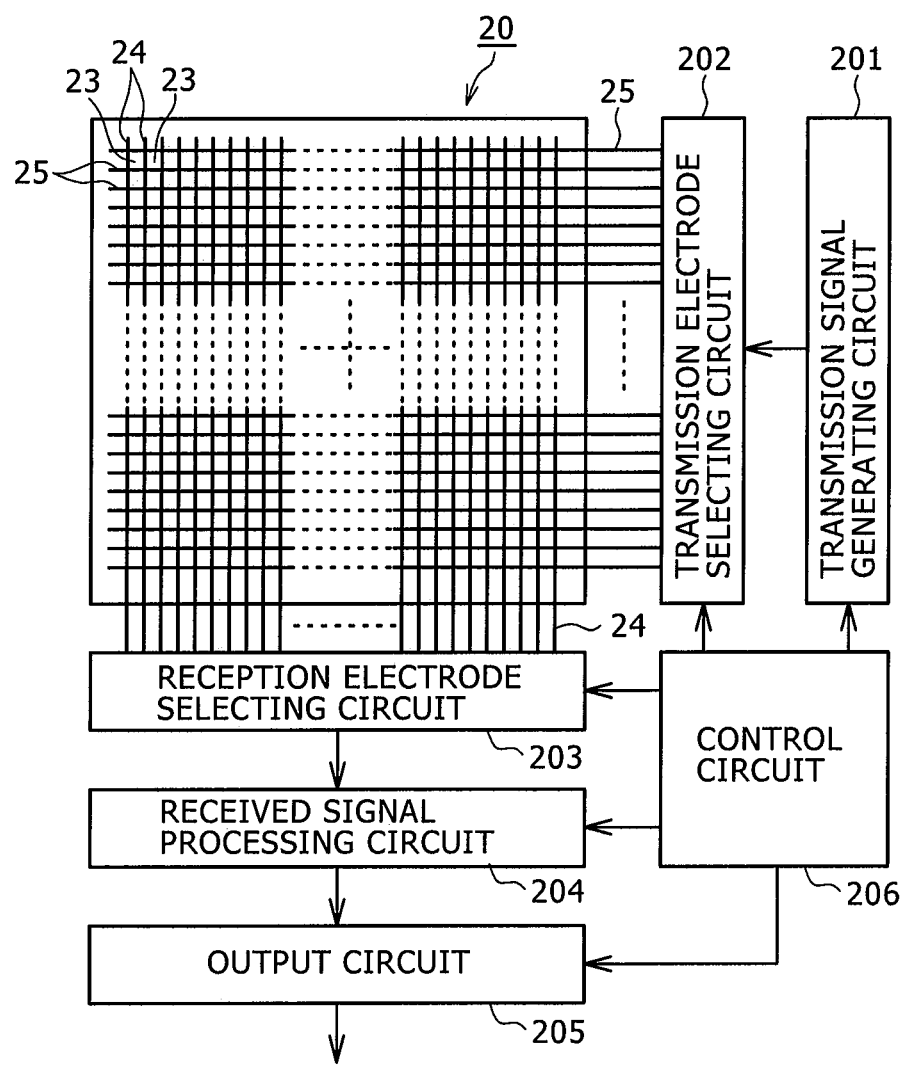
FIG. 2 is a block diagram of an example of a configuration of a sensor circuit in the position detector including the first embodiment of the position detecting sensor according to the present invention.

A sensor circuit portion (not shown in FIG. 1) serving as a signal processing circuit portion is provided on the transparent substrate 21, on which the first transparent electrodes 24, the second transparent electrodes 25, and the dummy patterns 23 are all disposed in the manner as described above. The sensor circuit portion, as shown in FIG. 2, includes a transmission signal generating circuit 201, a transmission electrode selecting circuit 202, a reception electrode selecting circuit 203, a received signal processing circuit 204, an output circuit 205, and a control circuit 206.

The transmission signal generating circuit 201 and the transmission electrode selecting circuit 202 compose a transmission signal supplying circuit, and the reception electrode selecting circuit 203 and the received signal processing circuit 204 compose a signal receiving circuit. Also, in this example, each of the first transparent electrodes 24 is used as a reception electrode, and each of the second transparent electrodes 25 is used as a transmission electrode.

The transmission signal generating circuit 201 supplies a predetermined transmission signal to the transmission electrode selecting circuit 202 at a timing controlled by the control circuit 206. The transmission electrode selecting circuit 202 selects predetermined second transparent electrodes 25 in accordance with the selection control by the control circuit 206. A transmission signal is supplied from the transmission signal generating circuit 201 to each of the second transparent electrodes 25 selected by the transmission electrode selecting circuit 202.

The reception electrode selecting circuit 203 successively selects the first transparent electrodes 24 in accordance with the control by the control circuit 206, and successively supplies received signals from the first transparent electrodes 24 thus selected to the received signal processing circuit 204.

The received signal processing circuit 204 processes the received signal in accordance with the control by the control circuit 206, detects a signal change caused by a position indicating operation of the indication body, such as a finger or a position indicator, on the position detecting sensor via the first transparent electrode 24, and supplies a detection output to the output circuit 205.

The output circuit 205 generates and outputs a detection signal corresponding to the position indicated by the indication body, such as the finger or the position indicator, based on detection of the first transparent electrode 24, in which the signal change is generated, from the detection output from the received signal processing circuit 204 and the second transparent electrode 25, to which the transmission signal is supplied at that time, in accordance with the control by the control circuit 206.

Mounted on the printed wiring board 40 are an Integrated Circuit (IC) for controlling the tablet device 10, other electronic components, and a copper foil wiring pattern. In addition, the printed wiring board 40 is provided with a connector (not shown), through which the printed wiring board 40 is connected to a sensor circuit of the sensor 20 described above and a display drive circuit of the LCD 30.

The upper case 51 and the lower case 52 composing the chassis of the tablet device 10 are made, for example, of synthetic resins. A concave portion 53 is formed in the lower case 52 of the chassis, for accommodating therein the transparent substrate 21, on which the position detecting sensor 20 is provided in position, the LCD substrate 31, and the printed wiring board 40. After the transparent substrate 21, on which the position detecting sensor 20 is provided in position, the LCD substrate 31, and the printed wiring board 40 are accommodated in the concave portion 53, the upper case 51 is adhered to the lower case 52 by, for example, using an adhesive agent to cover the concave portion 53, thereby assembling the tablet device 10.

Pattern Shape of Position Detecting Sensor 20

Next, detailed pattern shapes of the first transparent electrodes 24, the second transparent electrodes 25, and the dummy patterns 23 in the position detecting sensor 20 will be described with reference to FIG. 3.

Firstly, an ITO film is uniformly formed on a predetermined area on one surface of the transparent substrate 21. Next, a mask pattern is used for the ITO film and, for example, a photolithography process is carried out by using the mask pattern, whereby an electrode pattern having the grid structure is formed. Specifically, in the grid structure, the first transparent electrodes 24 and the second transparent electrodes 25, and the dummy patterns 23 which are electrically independent of each of the first transparent electrodes 24 and the second transparent electrodes 25 and each of which is held in the electrically floating state, all composed of the ITO film, are formed at the same time.

Figure 3:
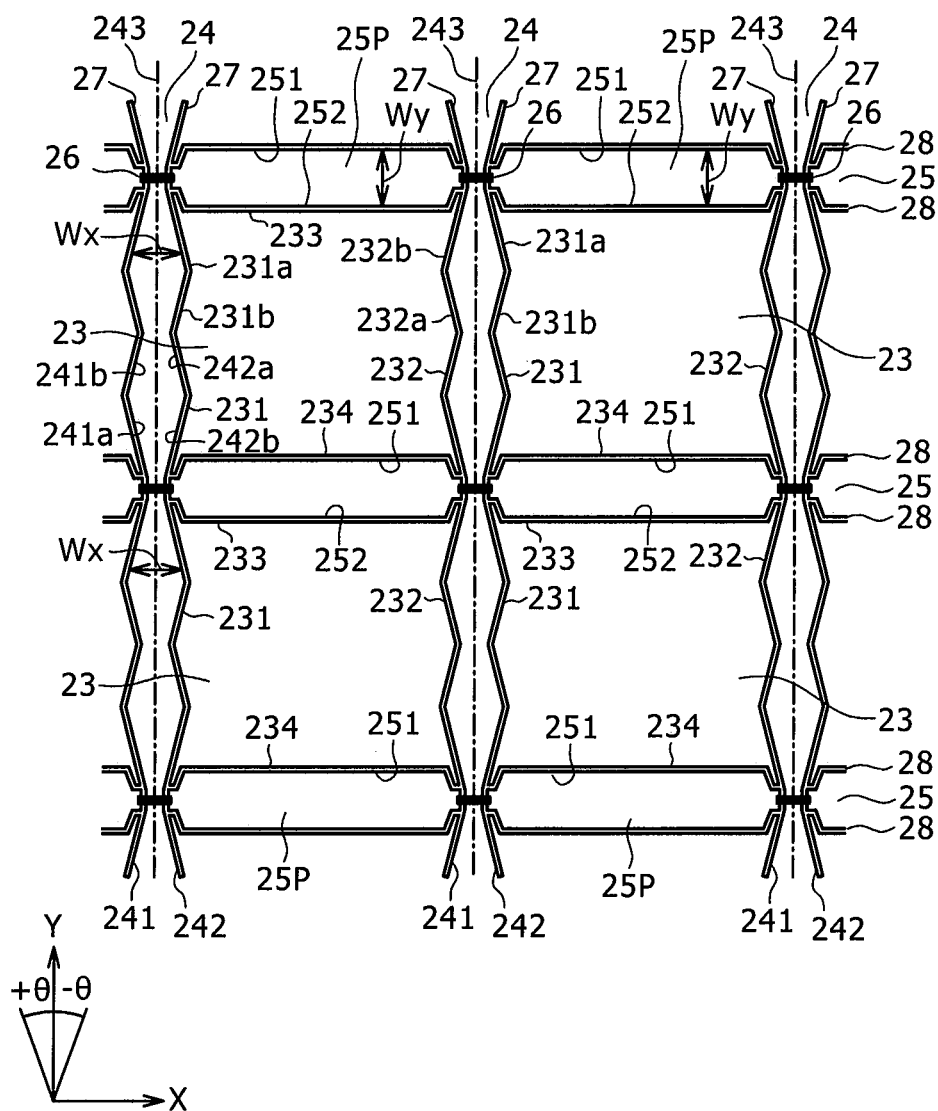
FIG. 3 is a view illustrating an example of a structure of the first embodiment of the position detecting sensor according to the present invention.

It is noted that FIG. 3 shows only a portion of the transparent electrode group 22 composed of three of the first transparent electrodes 24 and three of the second transparent electrodes 25, and also shows the structures of the first transparent electrodes 24, the second transparent electrodes 25, and the dummy patterns 23 in detail.

As shown in FIG. 3, the first transparent electrodes 24 are formed as the conductive members each extending in the Y-axis direction and having a predetermined outline, as will be described later, and are disposed on the transparent substrate 21 at the predetermined intervals in the X-axis direction. The second transparent electrodes 25 are formed as the conductive members each having a given width Wy and extending in the X-axis direction, and are disposed on the transparent substrate 21 at the predetermined intervals in the Y-axis direction. At this manufacturing stage, plural conductive member pieces 25P are disposed on the transparent substrate 21 in the X-axis direction, which are electrically separated from one another at portions where the first transparent electrodes 24 exist.

Next, an insulating layer (not shown) is formed in the intersection portion between each of the first transparent electrodes 24 and the corresponding second transparent electrode 25 by, for example, carrying out the photolithography process. Next, a conductive layer 26 is formed for electrically connecting (bridging) two adjacent conductive member pieces 25P in the X-axis direction on the insulating layer by, for example, carrying out the photolithography process in a state in which the insulation between the corresponding ones of the first transparent electrodes 24 and the conductive layer 26 is maintained by the insulation layer. By forming the conductive layer 26, each of the plural conductive member pieces 25P disposed in the X-axis direction is electrically connected to one another, thereby forming the second transparent electrodes 25 extending in the X-axis direction.

It is noted that in the first embodiment, at each cross-point portion where each of the first transparent electrodes 24 and the corresponding second transparent electrode 25 cross each other, a width of the first transparent electrode 24 is narrowed and a width of the conductive member piece 25P forming the second transparent electrode 25 is also narrowed, and each of the insulating layer and the conductive layer 26 is formed as small as possible. As a result, the device is made such that the light transmittance of each cross-point portion where each of the first transparent electrodes 24 and the corresponding second transparent electrode 25 cross each other is made to vary as little as possible to be inconspicuous from that of other portions of the sensor substrate 21.

Electrode Pattern Shape of Position Detecting Sensor 20; Measures Against the Moire Effect Next, with reference to FIG. 3, a description will be given with respect to a conductor pattern shape on the sensor substrate 21, for decreasing the Moire effect that is otherwise likely to be caused between a pixel disposition pattern of the LCD 30 and the conductor pattern.

It is noted that an example shown in FIG. 3 corresponds to the case where each of an outline of the electrode pattern of the first transparent electrodes 24, and an outline extending in the Y-axis direction of the dummy patterns 23, serves to decrease the Moire effect caused between the pixel disposition pattern of the LCD 30 in the Y-axis direction and the pattern of the first transparent electrodes 24. In the first embodiment, in the pixels 32 of the LCD 30, the sub-pixels corresponding to the same color are disposed in a line in the Y-axis direction. Therefore, the Moire effect is easily and conspicuously generated between the pixel disposition in the Y-axis direction, and the first transparent electrodes 24 extending in the Y-axis direction in the position detecting sensor 20.

It should be apparent according to the present invention that, each of the outline of the electrode pattern of the second transparent electrodes 25 extending in the X-axis direction, and the outline of the dummy pattern 23 extending in the X-axis direction, can be equally applied to address (decrease) the Moire effect generated between a pixel disposition in the X-axis direction of the LCD 30 and the conductor pattern.

As shown in FIG. 3, an area defined by four cross-points, where two adjacent first transparent electrodes 24 and two adjacent second transparent electrodes 25 cross each other, has a generally rectangular shape. As a result, the positions of the cross-points of the position detecting sensor 20 can be located along the straight lines in the Y-axis direction and in the X-axis direction, respectively. As a result, it becomes unnecessary to execute any position correction processing during the position detection calculation operation, and thus the position detection operation becomes easier.

In the first embodiment, the first transparent electrode 24 is formed so as to have a predetermined electrode pattern between two cross-points disposed along the Y-axis direction.

The first transparent electrode 24 has a shape, which has a predetermined inclination (or a tilt) with respect to the Y-axis direction, and which is line-symmetric about a straight line in the Y-axis direction. Specifically, as shown in FIG. 3, the first transparent electrode 24 has the shape defined by two contours 241 and 242 extending in the Y-axis direction. In this case, the two contours 241 and 242 of the first transparent electrode 24 extending in the Y-axis direction are made non-parallel with the Y-axis direction.

In the first embodiment, the contour 241 and the contour 242 have a structure, in which line segments 241a and 242a each inclining at $+\theta$ ($\theta>0$) with respect to the Y-axis direction, and line segments 241b and 242b each inclining at $-\theta$ with respect to the Y-axis direction are connected to each other. The contour 241 and the contour 242 are formed in such a way that the line segment 241a inclining at $+\theta$ with respect to the Y-axis direction and the line segment 242b inclining at $-\theta$ with respect to the Y-axis direction face each other in the X-axis direction, and the line segment 241b inclining at $-\theta$ with respect to the Y-axis direction and the line segment 242a inclining at $+\theta$ with respect to the Y-axis direction face each other in the X-axis direction.

The inclination angle $\theta$, with respect to the Y-axis direction, of the line segments 241a, 241b, and 242a, 242b composing the contours 241 and 242, respectively, of the first transparent electrode 24 can be considered as an angle relative to the longitudinal direction, in which the same sub-pixels are disposed in the LCD 30. Thus, the inclination angle θ is suitably selected in order to prevent generation of the Moire fringes. When the inclination angle θ was set in the range equal to or larger than 5 degrees and equal to or smaller than 45 degrees, the effect of preventing generation of the Moire fringes was visually confirmed. In this example, the inclination angle θ is set to ∝=15 degrees.

Although a width Wx of each of the first transparent electrodes 24 is not constant, a central line 243 (indicated by a dashed line in FIG. 3) connecting midpoints of varying widths Wx in the X-axis direction is a straight line parallel with the Y-axis direction. In other words, each of the first transparent electrodes 24 is structured so as to have a shape that is line-symmetric about the central line 243 as the axis of symmetry, which is a straight line parallel with the Y-axis direction.

Since the first transparent electrode 24 has a shape that is line-symmetric about a straight line parallel with the Y-axis direction as the axis of symmetry, the same circuit as that which is used when the first transparent electrode 24 has a straight (linear) pattern having a constant width can be used as the received signal processing circuit 204 when the first transparent electrode 24 is used as the reception electrode. Thus, it is unnecessary to perform position correcting processing or the like based on an indicated position.

In addition, the first transparent electrode 24 has the shape, in which the line segments 241a and 242a each inclining at +θ with respect to the Y-axis direction, and the line segments 241b and 242b each inclining at −θ with respect to the Y-axis direction, are repetitively disposed plural times, in this example, twice in the Y-axis direction between two adjacent cross-points.

For the purpose of decreasing or preventing generation of the Moire fringes, in accordance with various embodiments of the present invention, it is only necessary that the first transparent electrode 24 has at least one structure having both of the inclinations inclining at +θ and −θ with respect to the Y-axis direction, respectively, between two adjacent cross-points disposed in the Y-axis direction.

However, when the first transparent electrode 24 has only one shape having both of the inclinations inclining at +θ and −θ with respect to the Y-axis direction, respectively, between two adjacent cross-points disposed in the Y-axis direction, a maximum value of the width Wx of the first transparent electrode 24 becomes large, and thus a noise becomes easily detectable.

In addition, when the first transparent electrode 24 has a structure in which a shape having both of the inclinations inclining at +θ and −θ with respect to the Y-axis direction, respectively, is repeated many times between two adjacent cross-points disposed in the Y-axis direction, the contours 241 and 242 in the Y-axis direction of the first transparent electrode 24 become approximately straight lines parallel with the Y-axis direction, to thereby lose some of the effect of preventing the Moire effect.

Therefore, in accordance with exemplary embodiments of the present invention, it is desirable for the first transparent electrode 24 to have a structure in which the shape having both of the inclination angles of +θ and −θ with respect to the Y-axis direction, respectively, is repeated twice or more, but less than a number of times at which the Moire preventing effect starts to lessen, between two adjacent cross-points disposed in the Y-axis direction as measures against both the noise and the Moire effect.

The second transparent electrode 25 (the conductive member pieces 25P) disposed in the X-axis direction has a shape defined by two contours 251 and 252 extending in the X-axis direction. As described above, in the first embodiment, the sub-pixels corresponding to the same color are disposed in a line in the Y-axis direction. For this reason, it is known that the Moire effect is not as likely to occur between the pixels 32 of the LCD 30 disposed in the X-axis direction and the second transparent electrodes 25, as with the case of the first transparent electrodes 24. Thus, each of the contours 251 and 252 of the second transparent electrode 25 extending in the X-axis direction may be made as a straight line, and the second transparent electrode 25 is composed of a conductive member such as an ITO film having a given width Wy similarly to the conventional case.

As shown in FIG. 3, outlines of the dummy pattern 23 in the Y-axis direction are defined by two contours 231 and 232 disposed close to the contours 242 and 241 of the first transparent electrode 24, respectively. In addition, outlines of the dummy pattern 23 extending in the X-axis direction are defined by two contours 233 and 234 disposed close to the contours 252 and 251 of the second transparent electrode 25, respectively.

The two contours 231 and 232 extending in the Y-axis direction of the dummy pattern 23 are formed with spaces 27 each having a predetermined width from the two contours 242 and 241 of the first transparent electrode 24, respectively, so as to attain uniform optical characteristics for the position detecting sensor 20. Therefore, the two contours 231 and 232 extending along the Y-axis direction of the dummy pattern 23 have shapes, in which line segments 231a and 232a each inclining at +θ with respect to the Y-axis direction, and line segments 231b and 232b each inclining at −θ with respect to the Y-axis direction, are continuously connected to each other, respectively. It is noted that the space 27 is formed with a given width.

Two contours 233 and 234 extending in the X-direction of the dummy pattern 23, and two contours 252 and 251 of the two adjacent second transparent electrodes 25 which hold the dummy pattern 23 between them in the Y-axis direction, are formed with spaces 28 therebetween each having a predetermined width. It is noted that the space 28 is formed with a given width.

Figure 4:
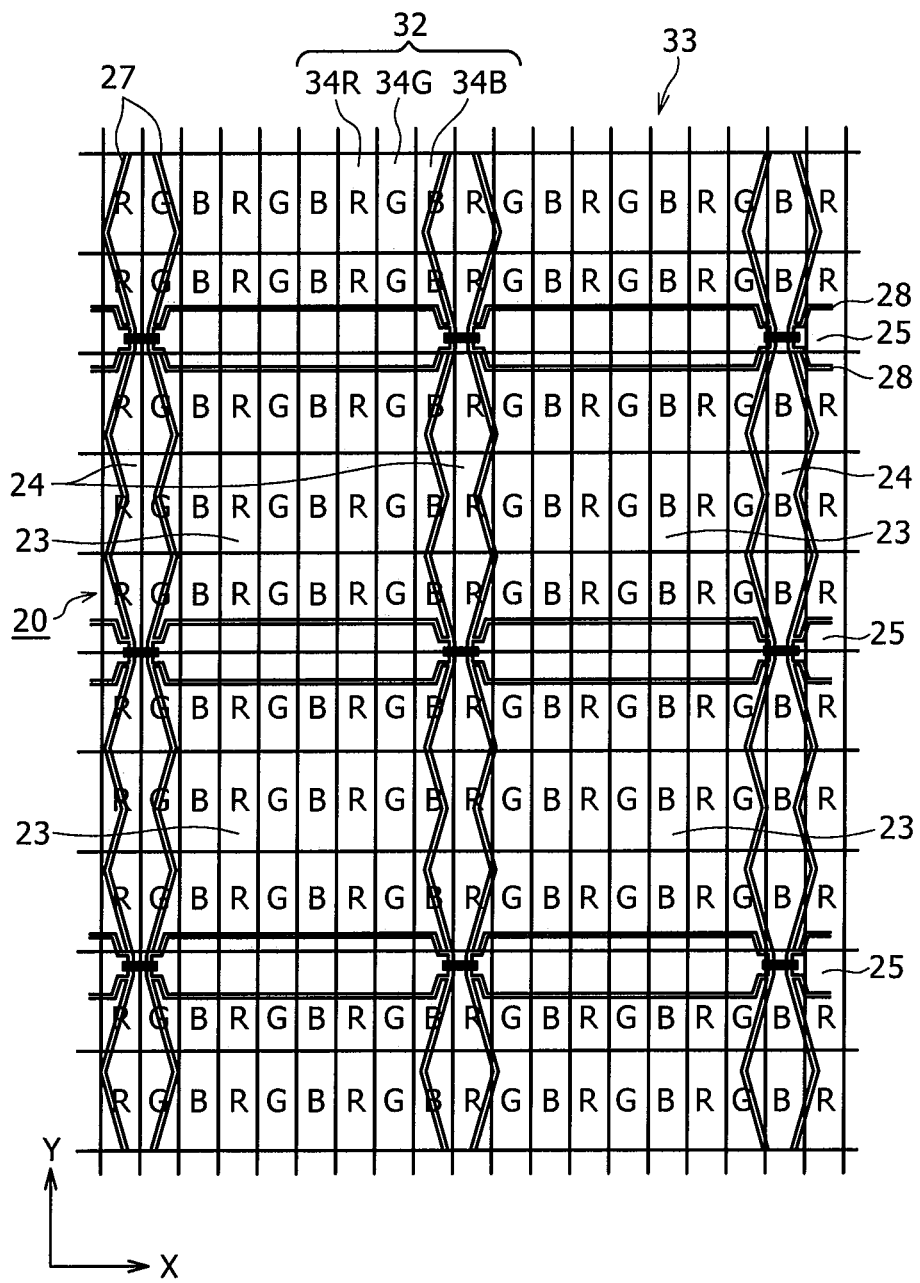
FIG. 4 is a view showing an example of a state in which the position detecting sensor shown in FIG. 3 is superposed on a display surface.

FIG. 4 shows an example of a positional relationship among the pixel disposition pattern, the electrode pattern of the first transparent electrodes 24 and the second transparent electrodes 25, and the dummy patterns 23 when the position detecting sensor 20 is superposed on the display surface 33 of the LCD 30.

As shown in FIG. 4, sub-pixels 34R, 34G, and 34B corresponding to the three primary colors: red; green; and blue and composing the pixel 32 are repetitively disposed in order in the same row in the X-axis direction (in the transverse direction). In addition, with regard to each of the three sub-pixels 34R, 34G, and 34B, the same sub-pixel is repetitively disposed in the same column in the Y-axis direction, thereby composing the display surface 33 of the LCD 30.

In this example, the sub-pixels 34R, 34G, and 34B each corresponding to the same color are disposed in a line in the Y-axis direction. Thus, the Moire effect is likely to occur between the pixel disposition in the Y-axis direction and the first transparent electrodes 24 extending in the Y-axis direction of the sensor 20.

However, in the position detecting sensor 20 of the first embodiment, the contours of each of the first transparent electrodes 24 extending in the Y-axis direction have the shapes having the predetermined inclination angles of +θ and −θ with respect to the Y-axis direction, respectively. In addition, the dummy pattern 23 disposed close to the first transparent electrode 24 via the space 27 so as to attain uniform optical characteristics for the position detecting sensor 20 also has the predetermined inclination angles of +θ and −θ with respect to the Y-axis direction, respectively. Therefore, generation of the Moire fringes is reduced or prevented between the disposition pattern in the Y-axis direction of the display pixels 32 of the LCD 30 and the electrode pattern of the sensor 20.

In the first embodiment, the shape of the area formed by the four cross-points at which two adjacent first transparent electrodes 24 and two adjacent second transparent electrodes 25 cross each other is maintained as a rectangular shape even when the measures against the Moire effect are taken. Thus, it is unnecessary to execute any position correction processing based on a position indication made by the indication body, which would otherwise be needed when the area does not have a rectangular shape.

Moreover, in the first embodiment, each of the first transparent electrodes 24 extending in the Y-axis direction has a shape that is line-symmetric about a straight central line 243, which is formed in the Y-axis direction by connecting the central points of the (varying) width Wx that extend in the X-axis direction, as the axis of symmetry. Therefore, the same circuit as that which is used when each of the first transparent electrodes 24 has a straight (linear) line pattern having a given (fixed) width in the X-axis direction can be used as the received signal processing circuit 204 for receiving the signal from the first transparent electrode 24 used as a reception electrode. As a result, it is unnecessary to execute position correction processing, which is typically required when a reception electrode does not having a given (fixed) width in the X-axis direction.

Modification Examples of the First Embodiment

In the first embodiment described above, the inclination angles θ are set identical to one another in the plural first transparent electrodes 24, though it is obvious that the inclination angles θ need not be identical to one another in all of the plural first transparent electrodes 24.

For example, in every other first transparent electrode 24 disposed along the X-axis direction, similarly to the case of the first embodiment described above, the contours 241 and 242 thereof may be composed of line segments having a positive inclination angle of θ=+15 degrees, and a negative inclination angle of θ=−15 degrees, respectively. In each of the rest of the first transparent electrodes 24 disposed along the X-axis direction, the contours 241 and 242 thereof may be composed of line segments having a positive inclination angle of +θ'≠15 degrees (5 degrees ≤θ'≤45 degrees), for example, θ'=20 degrees, and a negative inclination of −θ', respectively.

It is noted that the first transparent electrodes 24 having different inclination angles are by no means limited to the case where every other first transparent electrode 24 along the X-axis direction has different inclination angles, and it is possible to have every two or more electrodes 24 have different inclination angles, for example.

In the first embodiment, a portion of the first transparent electrode 24 located between two adjacent cross-points disposed in the Y-axis direction has a structure in which the contours composed of the line segment inclining at +θ with respect to the Y-axis direction, and the line segment inclining at −θ with respect to the Y-axis direction, are repetitively disposed twice. However, it is not necessary for the same contours or shape to be repeated in the Y-axis direction. For example, following the contours composed of the line segment inclining at +θ with respect to the Y-axis direction and the line segment inclining at −θ with respect to the Y-axis direction, it is possible to provide contours composed of line segments having inclination angles that are not +θ and −θ.

In the first embodiment described above, a predetermined space is formed between the contours 241 and 242 extending in the Y-axis direction of the first transparent electrode 24 and the contours 232 and 231 of the dummy pattern 23 facing the contours 241 and 242, respectively. It is noted that a desired value can be selected as the width of the space, as long as determined uniform optical characteristics can be ensured for the position detecting sensor 20. In addition, the width of the space need not be constant. In other words, as described above, in accordance with various embodiments of the present invention, it is only necessary for the dummy pattern 23 to have contours including determined inclination angles with respect to the disposition of the pixels 32 of the LCD 30 along the Y-axis direction.

In addition, in the first embodiment, the contours 241 and 242 of each of the first transparent electrodes 24 extending in the Y-axis direction and the contours 232 and 231 extending in the Y-axis direction of the dummy pattern 23, which are formed close to the contours 241 and 242 of each of the first transparent electrodes 24 extending in the Y-axis direction, together form the structure adopted for preventing the Moire effect from appearing between the disposition of the pixels 32 of the LCD 30 in the Y-axis direction and the electrode pattern of the sensor 20. However, it is obvious that the present invention can be also applied to the outlines extending in the X-axis direction, as defined by the shape (contours) of each of the second transparent electrodes 25 extending in the X-axis direction and the contours 233 and 234 extending in the X-axis direction of the dummy pattern 23. As a result, it is also possible to prevent the Moire effect from appearing between the disposition of the pixels 32 of the LCD 30 in the X-axis direction and the electrode pattern of the sensor 20.

Second Embodiment

When the dummy pattern 23 composed of an ITO film having the same light transmittance as that of each of the first transparent electrodes 24 and the second transparent electrodes 25 is formed in the area, which is surrounded by two adjacent first transparent electrodes 24 and two adjacent second transparent electrodes 25 in the position detecting sensor 20 utilizing the capacitive system, as in the first embodiment described above, a distance "d" between the first transparent electrode 24 and the second transparent electrode 25 is shortened due to the presence of the dummy pattern 23 composed of the conductive member. For this reason, a coupling capacitance $C (=k \cdot S/d$ (k is a proportional constant, and S is a facing area of electrodes)) between the first transparent electrode 24 and the corresponding second transparent electrode 25 becomes large.

In the cross-point capacitive system, a capacitance change that occurs when the indication body, such as a finger or a position indicator, comes close to or in contact with the sensor 20 is detected relative to the coupling capacitance between the first transparent electrode 24 and the corresponding second transparent electrode 25. Therefore, when the coupling capacitance between the first transparent electrode 24 and the corresponding second transparent electrode 25 becomes large, it becomes difficult to detect a capacitance change that occurs when the indication body comes close to or in contact with the sensor 20.

In order to address this issue, in a position detecting sensor of the second embodiment, a divided dummy pattern DP composed of plural small dummy patterns, into which the dummy pattern 23 is divided, is provided in the area surrounded by the two adjacent first transparent electrodes 24 and the two adjacent transparent electrodes 25, instead of the dummy pattern 23 composed of one unitary area.

As a result, the coupling capacitance between the first transparent electrode 24 and the corresponding second transparent electrode 25 can be regarded as a capacitance of plural capacitors that are connected in series with one another. Thus, it becomes possible to reduce the coupling capacitance as compared with the case of the dummy pattern 23 composed of one unitary area. Therefore, it becomes easier to detect a capacitance change that occurs when the indication body, such as a finger or a position indicator, comes close to or comes in contact with the position detecting sensor, and thus it is possible to increase the position detection sensitivity.

However, in the second embodiment, since the divided dummy pattern DP composed of the plural small dummy patterns is provided instead of the dummy pattern 23, the Moire effect might occur between contours (outlines) of the small dummy patterns and the disposition pattern of the pixels 32 of the LCD 30. In order to address this issue, in the second embodiment, measures are taken to reduce or prevent the Moire effect from occurring between the disposition pattern of the pixels 32 of the LCD 30 and the contours of the small dummy patterns.

Figure 5:
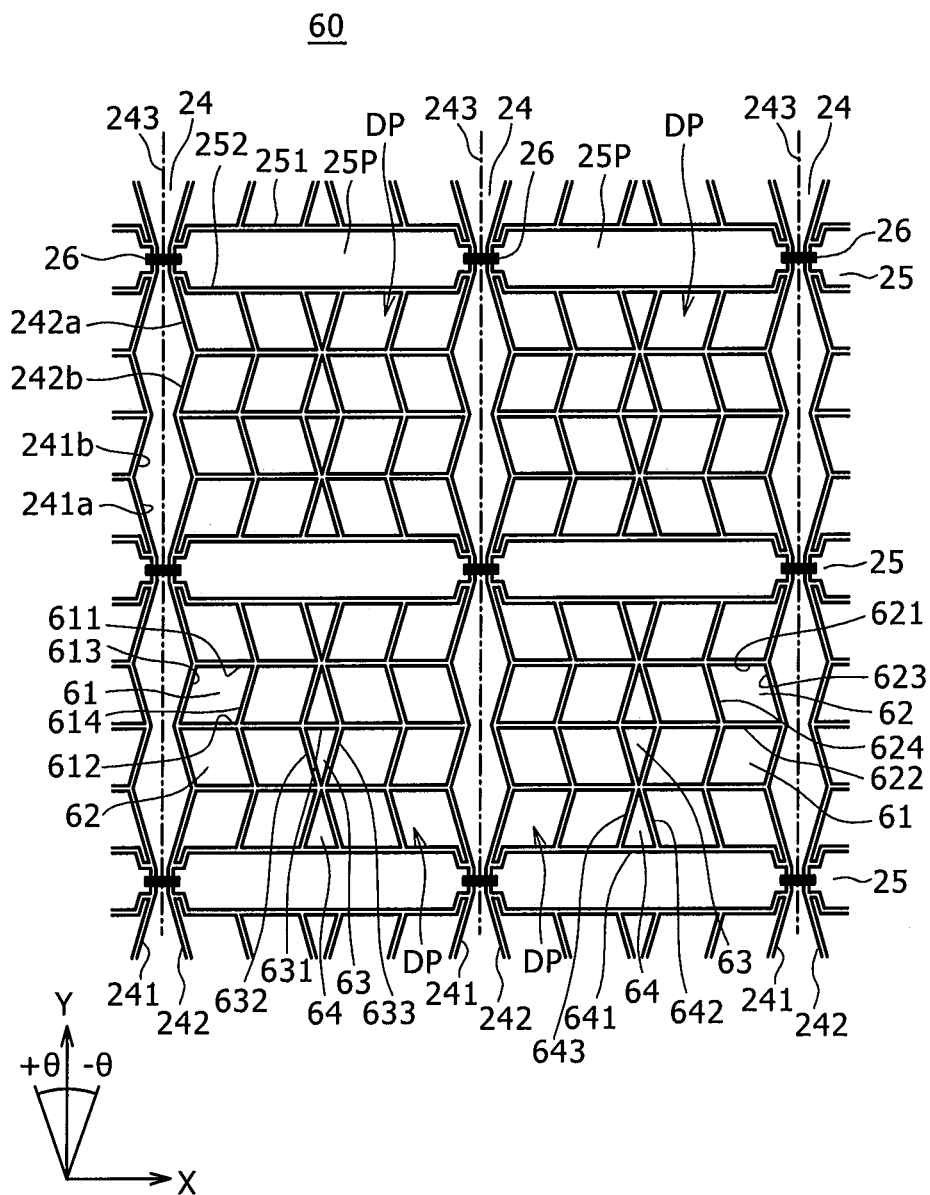
FIG. 5 is a view illustrating an example of a structure of a second embodiment of the position detecting sensor according to the present invention.

FIG. 5 shows an example of a pattern shape of the electrode pattern having the grid structure, which includes the first transparent electrodes 24 and the second transparent electrodes 25 and the divided dummy pattern DP, in a position detecting sensor 60 of the second embodiment. In the position detecting sensor 60 of the second embodiment shown in FIG. 5, portions having the same structures as those in the position detecting sensor 20 of the first embodiment described above are designated by the same reference symbols, respectively, and detailed description thereof is omitted.

In the second embodiment to be described below, similarly to the case of the first embodiment described above, the Moire effect may occur between the disposition of the pixels 32 of the LCD 30 extending in the Y-axis direction and the electrode pattern of the small dummy patterns in the position detecting sensor 60, and measures to be taken against generation of the Moire effect will now be described.

As shown in FIG. 5, in the second embodiment, the first transparent electrodes 24 and the second transparent electrodes 25 have the electrode patterns having the same shapes as those in the case of the first embodiment described above. On the other hand, the divided dummy pattern DP is provided by combining two kinds of parallelogram-like small dummy patterns 61 and 62, and two kinds of triangle-like small dummy patterns 63 and 64.

The small dummy pattern 61 has a parallelogram-like shape, which is surrounded by contours 611 and 612 each parallel with the X-axis direction and contours 613 and 614 each having an inclination angle of −θ with respect to the Y-axis direction. The small dummy pattern 62 has a parallelogram-like shape, which is surrounded by contours 621 and 622 parallel with the X-axis direction and contours 623 and 624 each having an inclination angle of +θ with respect to the Y-axis direction.

The small dummy pattern 63 has a triangle-like shape, which is surrounded by a contour 631 parallel with the X-axis direction, a contour 632 having an inclination angle of +θ with respect to the Y-axis direction, and a contour 633 having an inclination angle of −θ with respect to the Y-axis direction.

The small dummy pattern 64 has a triangle-like shape, which is surrounded by a contour 641 parallel with the X-axis direction, a contour 642 having an inclination angle of +θ with respect to the Y-axis direction, and a contour 643 having an inclination angle of −θ with respect to the Y-axis direction. Also, the triangle-like small dummy pattern 63 is disposed so as to have a vertex located downward, and the triangle-like small dummy pattern 64 is disposed so as to have a vertex located upward, as shown in FIG. 5.

The inclination angle, θ, is perfectly identical to that in the first embodiment described above and, for example, is set in the range of 5 degrees $\leq \theta \leq 45$ degrees. In this example, the inclination angle, θ, is set to θ=15 degrees.

Therefore, the contours 613 and 614 in the Y-axis direction of the parallelogram-like small dummy pattern 61 become parallel with the line segments 241b and 242b each having the inclination of −θ with respect to the Y-axis direction, which form the contours 241 and 242 of the first transparent electrode 24, respectively. The contours 623 and 624 in the Y-axis direction of the parallelogram-like small dummy pattern 62 become parallel with the line segments 241a and 242a each having the inclination of +θ with respect to the Y-axis direction, which form the contours 241 and 242 of the first transparent electrode 24, respectively. The contours 632 and 642 of the triangle-like small dummy patterns 63 and 64 become parallel with the line segments 241a and 242a, each having the inclination of +θ with respect to the Y-axis direction, which form the contours 241 and 242 of the first transparent electrode 24, respectively. Also, the contours 633 and 643 of the triangle-like small dummy patterns 63 and 64 become parallel with the line segments 241b and 242b each having the inclination of −θ with respect to the Y-axis direction, which form the contours 241 and 242 of the first transparent electrode 24, respectively.

As shown in FIG. 5, in the divided dummy pattern DP disposed in the area surrounded by two adjacent first transparent electrodes 24 and two adjacent second transparent electrodes 25, two parallelogram-like small dummy patterns 61 and two parallelogram-like small dummy patterns 62 and one triangle-like small dummy pattern 63 or 64 are disposed in the X-axis direction. In addition, this disposition pattern is repeated in four rows, to thereby form the structure in the Y-axis direction. In this case, the triangle-like small dummy patterns 63 and 64 are provided along the Y-axis direction at the center in the X-axis direction in the disposition of the divided dummy pattern DP.

These small dummy patterns 61, 62, 63, and 64 are formed so as to electrically float. In other words, these small dummy patterns 61, 62, 63, and 64 are formed so as to have predetermined spaces from the first transparent electrodes 24 and the second transparent electrodes 25. Also, these small dummy patterns 61, 62, 63, and 64 are formed so as to have predetermined spaces from each other, i.e., among the small dummy patterns 61, 62, 63, and 64.

Similarly to the case of the first embodiment described above, a mask pattern is used for an ITO film formed over the entire surface of the transparent substrate 21, and the divided dummy patterns DP are then formed together with the first and second transparent electrodes 24 and 25 by carrying out the photolithography process.

The divided dummy pattern DP in the second embodiment has a structure, which is point-symmetric about a central point in both the X-axis direction and the Y-axis direction of the area occupied by the divided dummy pattern DP. Therefore, the divided dummy patterns DP have the structure, which is point-symmetric about each of the intersection points (cross-points) between the first transparent electrodes 24 and the second transparent electrodes 25. Additionally, each of the divided dummy patterns DP is structured so as to have the shape which is line-symmetric about the central line extending in the X-axis direction of the area occupied by the corresponding one of the divided dummy patterns DP, and is also structured so as to have the shape which is line-symmetric about the central line extending in the Y-axis direction of that area as the axis of symmetry.

The divided dummy patterns DP have the pattern shape which is point-symmetric about each of the intersection points (cross-points) defined by the first transparent electrodes 24 and the second transparent electrodes 25. Therefore, according to the second embodiment, the position detection characteristics become uniform in all of the cross-points, and thus uniform sensor characteristics are obtained for the entire detection area of the sensor 20 (60).

When it is not necessary to obtain uniform position detection characteristics both in the X-axis direction and in the Y-axis direction in all of the cross-points, it is also possible to adopt the following structure. Specifically, to have the position detection characteristics to be uniform in the Y-axis direction, the pattern shapes of the divided dummy patterns DP should be vertically symmetric about the second transparent electrode 25 as the axis of symmetry. To have the position detection characteristics to be uniform in the X-axis direction, the pattern shapes of the divided dummy patterns DP should be horizontally symmetric about the first transparent electrode 24 as the axis of symmetry.

The divided dummy patterns DP are structured so as to have the pattern shapes as described above, whereby according to the second embodiment, it is possible to obtain the same effects as those in the first embodiment. Also, since line segments formed by the contours 241 and 242 of the first transparent electrode 24, and the contours 613, 614, 623, 624, 632, 633, 642, 643 in the Y-axis direction of the small dummy patterns 61, 62, 63, and 64 have predetermined inclinations with respect to the Y-axis direction, generation of the Moire fringes between these line segments and the disposition pattern in the Y-axis direction of the pixels 32 of the LCD 30 is either decreased or prevented.

Modification Examples of the Second Embodiment

The second embodiment has been described in such a way that the contours with respect to the Y-axis direction of the plural small dummy patterns 61, 62, 63, and 64 have the inclinations of ±θ in the divided dummy patterns DP. However, it is not necessary, for example, for the two small dummy patterns 61 and 62 disposed in the X-axis direction to have the same parallelogram. As described above, it is only necessary for the divided dummy pattern DP to have a shape corresponding to the shapes of the first transparent electrodes 24 and the second transparent electrodes 25, respectively, so that uniform transmittance can be ensured for the entire position detecting sensor 60. In addition, it is also only necessary to set the inclination angles of the contours of the small dummy patterns 61, 62, 63, and 64 to the determined values, respectively, with respect to the disposition direction of the pixels 32 of the LCD 30 so as to decrease or prevent the generation of the Moire fringes between the disposition direction of the pixels 32 of the LCD 30 and each of the directions of the contours of the small dummy patterns 61, 62, 63, and 64.

In this case as well, when the dummy pattern DP is structured so as to have the shape which is line-symmetric about the central line in the X-axis direction of the area occupied by the dummy pattern DP, and is also line-symmetric about the central line in the Y-axis direction, and is further point-symmetric about the central point in the X-axis direction and in the Y-axis direction, it becomes possible to have uniform sensor characteristics over the entire sensor substrate.

Other Embodiments and Modification Examples

In the first embodiment and second embodiment described above, the contours 241 and 242 in the Y-axis direction of the first transparent electrode 24 are composed of the straight line segments 241a and 242a each having the predetermined inclination of +θ with respect to the Y-axis direction and the straight line segments 241b and 242b each having the predetermined inclination of −θ with respect to the Y-axis direction, whereby the contours of the plural first transparent electrodes 24 have the shapes having the respective predetermined inclinations with respect to the Y-axis direction. However, the present invention is by no means limited to the case where the shapes of the plural first transparent electrodes are composed of such straight line segments having the inclinations of θ with respect to the Y-axis direction.

Figure 6:
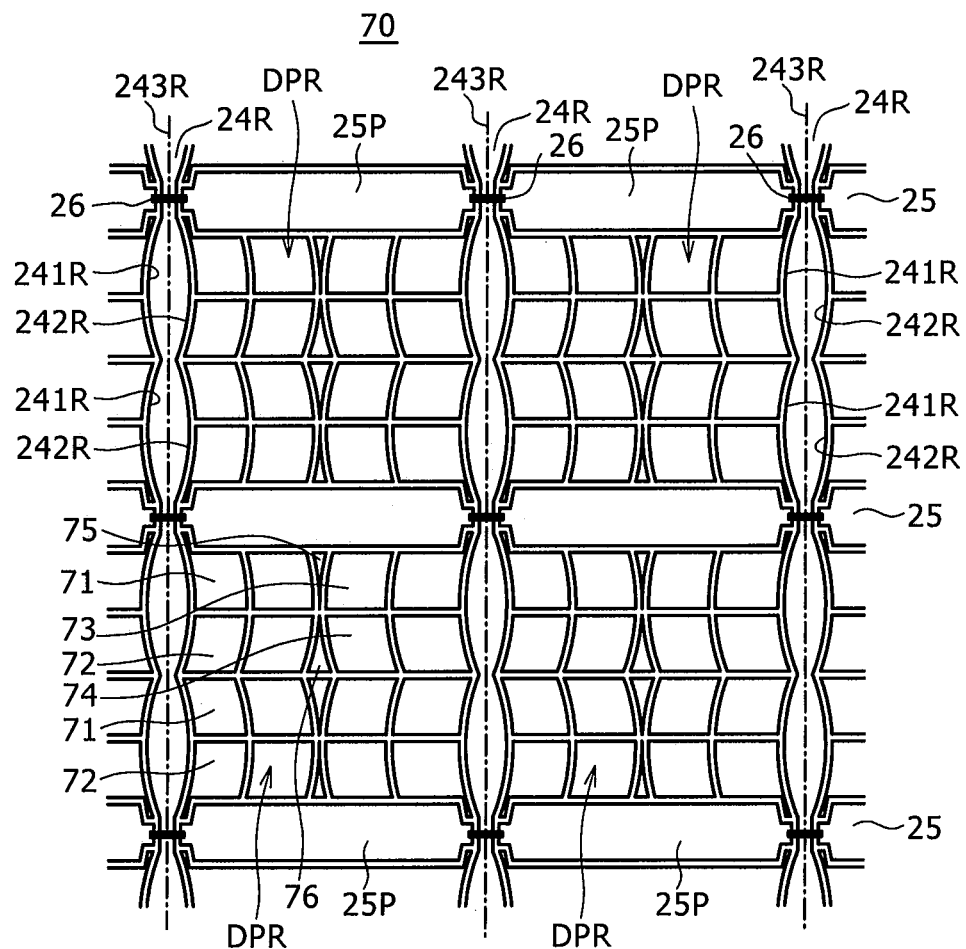
FIG. 6 is a view illustrating another example of the structure of the second embodiment of the position detecting sensor according to the present invention.

For example, a position detecting sensor 70 of an example shown in FIG. 6 is a case where an arc-like curved line shape in the Y-axis direction, a so-called rounded shape, is used as a shape of a first transparent electrode to obtain a shape having a predetermined inclination with respect to the Y-axis direction. In addition, the position detecting sensor 70 of the example shown in FIG. 6 is a case where the second embodiment is applied, in which a dummy pattern is formed as a divided dummy pattern. It is noted that, in the position detecting sensor 70 of the example shown in FIG. 6, portions having the same structures as those shown in the first embodiment described above are designated by the same reference symbols, respectively, and a detailed description thereof is omitted.

In each of plural first transparent electrodes 24R of an example shown in FIG. 6, two contours in the Y-axis direction are composed of arc-like curved lines 241R and 242R, which are line-symmetric about a central line 243R of a width of the corresponding one of the first transparent electrodes 24R. Also, in the example shown in FIG. 6, the first transparent electrode 24R has a shape in which the arc-like curved lines 241R and 242R that are line-symmetric are repetitively disposed twice between two adjacent cross-points disposed in the Y-axis direction. As described above, the number of times the pattern disposition is repeated is set to two or more, but less than a number of times at which the Moire prevention effect may start to lessen, so as to achieve measures against both the Moire effect and the noise.

A divided dummy pattern DPR of an example shown in FIG. 6 is composed of six kinds of small dummy patterns 71, 72, 73, 74, 75, and 76 having respective shapes corresponding to the outline of the first transparent electrode 24R. Specifically, in the example shown in FIG. 6, any of the small dummy patterns 71, 72, 73, and 74 has two contours each composed of a straight line parallel with the X-axis direction. The small dummy pattern 71 further has contours of two curved lines parallel with the first-half curved line of the arc-like curved line 242R extending between two adjacent cross-points disposed in the Y-axis direction, and has a quadrangle-like shape surrounded by these contours of the two curved lines and the two straight lines parallel with the X-axis direction.

The small dummy pattern 72 has contours of two curved lines parallel with the second-half curved line of the arc-like curved line 242R extending between two adjacent cross-points disposed in the Y-axis direction, and has a quadrangle-like shape surrounded by these contours of the two curved lines and the two straight lines parallel with the X-axis direction.

The small dummy pattern 73 has contours of two curved lines parallel with the first-half curved line of the arc-like curved line 241R extending between two adjacent cross-points disposed in the Y-axis direction, and has a quadrangle-like shape surrounded by these contours of the two curved lines and the two straight lines parallel with the X-axis direction.

The small dummy pattern 74 has contours of two curved lines parallel with the second-half curved line of the arc-like curved line 241R extending between two adjacent cross-points disposed in the Y-axis direction, and has a quadrangle-like shape surrounded by these contours of the two curved lines and the two straight lines parallel with the X-axis direction.

The small dummy pattern 75 has a wedge-like shape surrounded by a contour parallel with the first-half curved line of the arc-like curved line 241R extending between two adjacent cross-points disposed in the Y-axis direction, a contour parallel with the first-half curved line of the arc-like curved line 242R extending between two adjacent cross-points disposed in the Y-axis direction, and a contour of a straight line parallel with the X-axis direction.

The small dummy pattern 76 has a wedge-like shape surrounded by a contour parallel with the second-half curved line of the arc-like curved line 241R extending between two adjacent cross-points disposed in the Y-axis direction, a contour parallel with the second-half curved line of the arc-like curved line 242R extending between two adjacent cross-points disposed in the Y-axis direction, and a contour of a straight line parallel with the X-axis direction.

The six kinds of small dummy patterns 71, 72, 73, 74, 75, and 76 are each composed of the same ITO film as that of each of the first transparent electrode 24R and the second transparent electrode 25, electrically independent of one another, and formed in an electrically floating state. Also, similarly to the case of the second embodiment described above, the divided dummy patterns DPR are formed concurrently with the formation of the first transparent electrodes 24R and the second transparent electrodes 25 by carrying out the photolithography process.

In the divided dummy pattern DPR, a first disposition pattern is formed, in which the small dummy pattern 71 is repetitively disposed twice in the X-axis direction, followed by the wedge-like small dummy pattern 75, which is in turn followed by the disposition of two of the small dummy patterns 73, and the first disposition pattern is repetitively disposed twice in the Y-axis direction. Further, a second disposition pattern is formed, in which the small dummy pattern 72 is repetitively disposed twice in the X-axis direction, followed by the wedge-like small dummy pattern 76, which is in turn followed by the disposition of two of the small dummy patterns 74, and the second disposition pattern is repetitively disposed twice in the Y-axis direction.

The divided dummy pattern DPR of the example shown in FIG. 6 also has a structure which is point-symmetric about a central point in the X-axis direction and in the Y-axis direction of the area occupied by the divided dummy pattern DPR. Therefore, the divided dummy patterns DPR have the structure which is point-symmetric about each of the intersection points (cross-points) between the first transparent electrodes 24R and the second transparent electrodes 25. It is noted that the divided dummy pattern DPR is structured so as to have a shape which is line-symmetric about a central line in the X-axis direction of the area occupied by the divided dummy pattern DPR, and is also line-symmetric about the central line in the Y-axis direction of that area as the axis of symmetry.

According to the present detecting sensor 70 of the example shown in FIG. 6, it is possible to obtain the same operation and effects as those in the second embodiment.

It is noted that, although in the embodiments described above, the first transparent electrodes, the second transparent electrodes, and the dummy patterns (including the divided dummy patterns) are all formed on one surface side of the transparent substrate, it is possible to adopt a structure, for example, in which the first transparent electrodes and the second transparent electrodes are formed on two different surfaces of the transparent substrate, respectively, and the dummy patterns are formed on either surface of the transparent substrate. It is also possible to adopt a structure in which both of the first and second transparent electrodes are provided on one surface of the transparent substrate, and the dummy patterns are formed on the other surface of the transparent substrate.

However, since in the embodiments described above, the first transparent electrodes, the second transparent electrodes, and the dummy patterns are all formed on one surface side of the transparent substrate, there is an advantage that the number of processes required for manufacturing the position detecting sensor 20 is reduced, and thus the position detecting sensor 20 can be inexpensively manufactured. In addition, when the first transparent electrodes, the second transparent electrodes, and the dummy patterns are separately formed on one surface and the other surface of the transparent substrate, a problem may arise that the visibility of the contours of the first transparent electrodes, the second transparent electrodes and the dummy patterns may vary depending on the thickness of the transparent substrate. Such problem can be avoided by forming all of the first transparent electrodes, the second transparent electrodes and the dummy patterns on one surface side of the transparent substrate.

It should be apparent to those skilled in the art that the number of small dummy patterns provided in the divided dummy pattern is by no means limited to the case of the embodiments described above.

Although each of the embodiments described above is the case where the present invention is applied to the position detecting sensor utilizing the capacitive system, the present invention can also be applied in another system, in which the pixels are linearly disposed to construct a display device such as an LCD or an organic EL element, and a transparent position detecting sensor is disposed so as to be superposed on a display surface of the display device.

Figure 7:
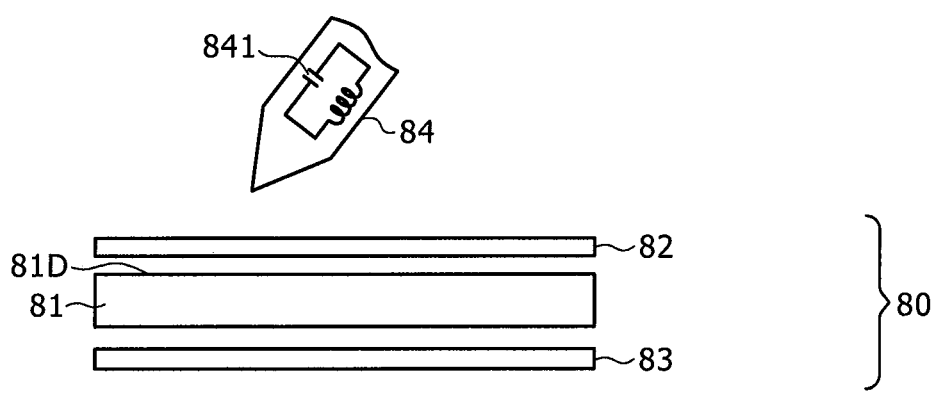
FIG. 7 is a view illustrating another embodiment of the position detector according to the present invention.
Figure 8:
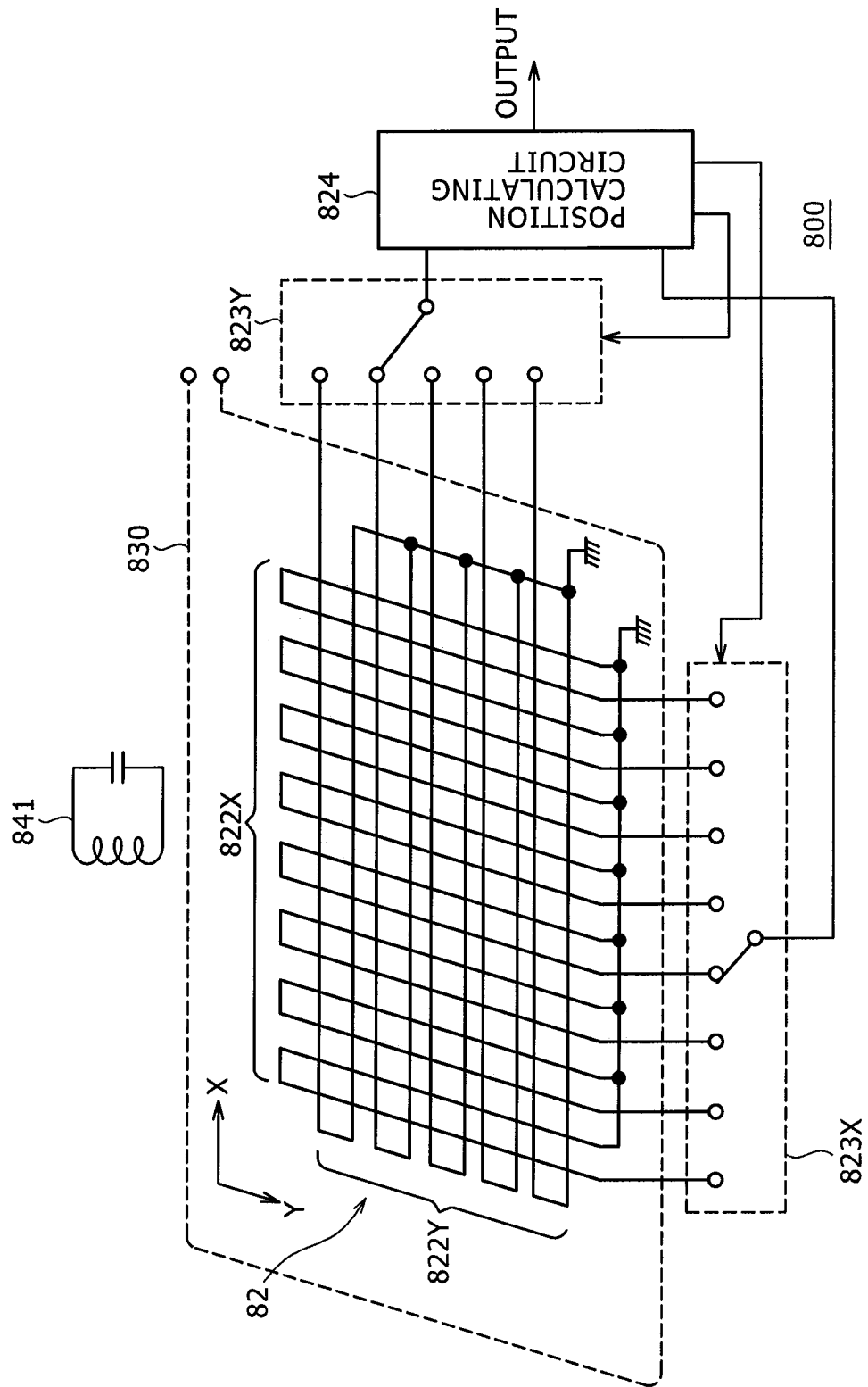
FIG. 8 is a view illustrating another embodiment of the position detector according to the present invention.
Figure 9:
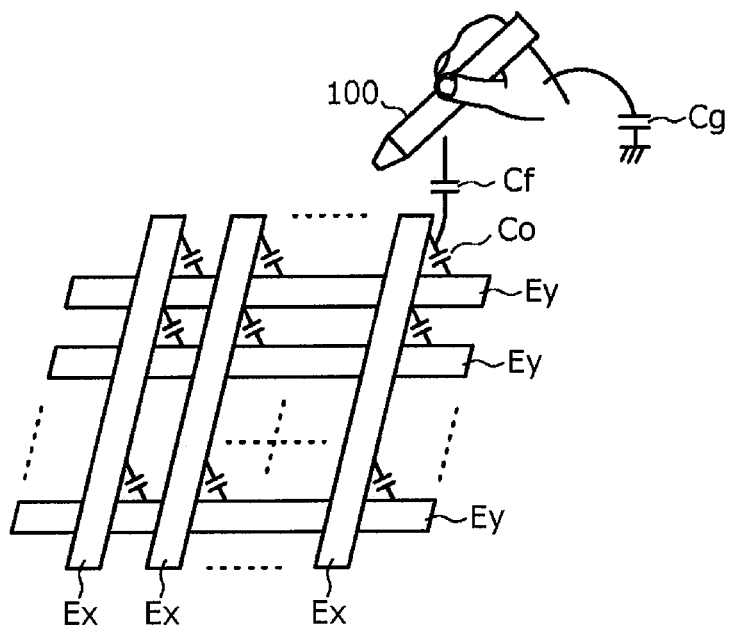
FIG. 9 is a view illustrating an example of a conventional position detecting sensor.
Figure 10:
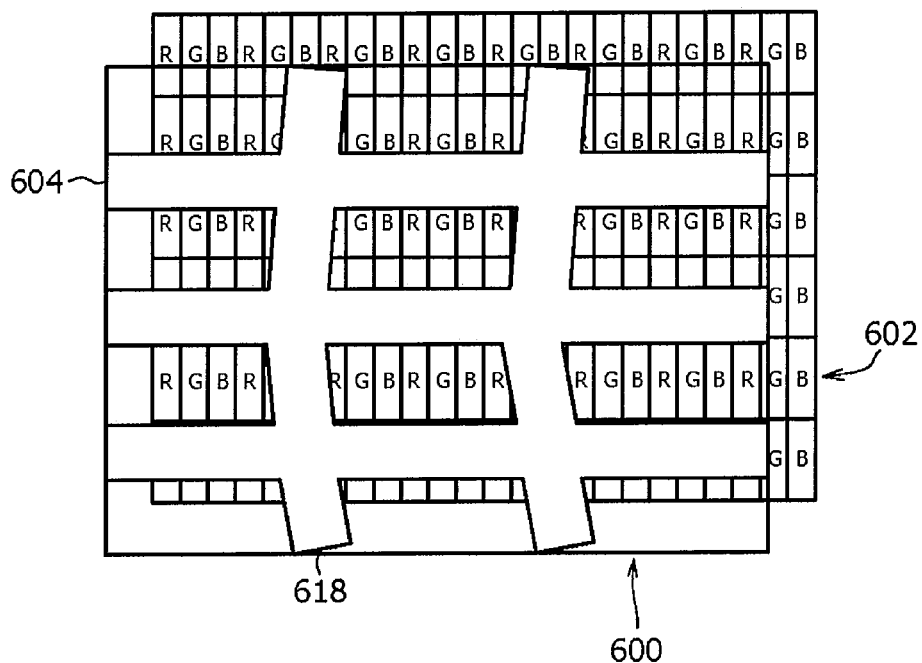
FIG. 10 is a view illustrating an example of measures taken to address generation of the Moire fringes in a conventional position detecting sensor.

For example, the present invention can also be applied to a position detecting sensor 80 utilizing an electromagnetic induction system, as shown in FIGS. 7 and 8. As shown in FIG. 7, the position detecting sensor 80 utilizing the electromagnetic induction system of this example includes a detecting coil substrate 82, having light permeability and being superposed on a display surface 81D of a display device 81 such as an LCD, and a driving coil substrate 83 disposed on a side opposite to the display surface 81D of the display device 81. Also, a position indicator 84 including a resonance circuit 841 is provided for use with the position detecting sensor 80 of this example.

In the driving coil substrate 83, a driving coil is disposed on a substrate that is made of, for example, resin or the like. Since the driving coil substrate 83 is provided on a back surface side of the display device 81, it is not necessary to form the driving coil substrate or the driving coil with a transparent material.

A signal having a predetermined frequency is supplied to the driving coil on the driving coil substrate 83 to generate an induced magnetic field, and an energy corresponding to the induced magnetic field is accumulated in the resonance circuit 841 of the position indicator 84. Then, the position indicator 84 supplies the magnetic field energy accumulated in the resonance circuit 841 to the detecting coil substrate 82.

In the detecting coil substrate 82, as shown in FIG. 8, detecting loop coils 822X and 822Y each composed, for example, of an ITO film are formed in a grid, and a signal processing circuit portion 800 is provided in the periphery of the detecting loop coils 822X and 822Y. The detecting loop coils 822X include a long portion disposed in the Y-axis direction. The plural detecting loop coils 822X are disposed at predetermined intervals in the X-axis direction on the detecting coil substrate 82. The detecting loop coils 822Y include a long portion disposed in the X-axis direction. The plural detecting loop coils 822Y are disposed at predetermined intervals in the Y-axis direction on the detecting coil substrate 82.

The signal processing circuit portion 800 includes selecting circuits 823X and 823Y, and a position calculating circuit 824. The selecting circuit 823X selects any one of the detecting loop coils 822X in accordance with the control by the position calculating circuit 824. In addition, the selecting circuit 823Y selects any one of the detecting loop coils 822Y in accordance with the control by the position calculating circuit 824.

The position calculating circuit 824 detects a position indicated by the position indicator 84 in accordance with signals, which are received at the detecting loop coils 822X and 822Y selected by the selecting circuits 823X and 823Y, respectively. In other words, induced currents are caused to flow through the detecting loop coils 822X and 822Y, respectively, based on a magnetic field generated by the resonance circuit 841 of the position indicator 84. The position calculating circuit 824 determines the positions of the detecting loop coils 822X and 822Y, through which the induced currents are caused to flow, respectively, while switching the selecting circuits 823X and 823Y, and calculates the position indicated by the position indicator 84 based on the determined positions of the loop coils 822X and 822Y to output a signal corresponding to the calculated position.

The detecting loop coils 822X and 822Y each composed of an ITO film are disposed in the X-axis direction and in the Y-axis direction, respectively, on the detecting coil substrate 82. Therefore, the detecting loop coils 822X and 822Y composed of the ITO film have shapes including predetermined contours, respectively. Thus, similarly to the case of the first transparent electrodes 24 and the second transparent electrodes 25 in the position detecting sensor 20, the Moire effect may occur between the pixels composing the display device 81 and the detecting loop coils 822X and 822Y. Therefore, the present invention can be applied not only to the position detecting sensor utilizing the capacitive system as described above, but also to the position detecting sensor utilizing the electromagnetic induction system having such a structure.

In this example, for the purpose of achieving uniformity of the light transmittance in the detecting coil substrate 82, a dummy pattern composed, for example, of an ITO film is provided in an area that exists between the detecting loop coils 822X and the detecting loop coils 822Y. Also, the dummy pattern having a shape corresponding to contour shapes of conductive members of the detecting loop coils 822X and 822Y is applied in this example. In addition, the dummy pattern may also be structured as a divided dummy pattern composed of plural small dummy patterns as with the second embodiment.

As described above, even in the case of the position detecting sensor utilizing the electromagnetic induction system shown in FIGS. 7 and 8, when the detecting coil substrate 82 is disposed so as to be superposed on the display surface of the display device such as the LCD, it is possible to either decrease or prevent the Moire effect, which may otherwise occur between the disposition of the display pixels of the LCD and either the conductive members of the detecting loop coils or the dummy pattern.

It is noted that although in the position detecting sensor 80 utilizing the electromagnetic induction system shown in FIGS. 7 and 8, the driving coils are disposed on the driving coil substrate 83, and thus are disposed on a side opposite to the display surface 81D of the display device 81, alternatively, the driving coils can be disposed in the periphery on the display surface 81D side of the display device 81.

Specifically, instead of using the driving coils disposed on the back surface of the display device 81 shown in FIG. 7, the driving coils, as indicated by a dotted line in FIG. 8, may also be disposed as circumferential exciting coil(s) 830 either on one surface of the detecting coil substrate 82 including the detecting loop coils 822X and 822Y disposed in the grid pattern, or in the circumference of the other surface of the detecting coil substrate 82. Based on the circumferential exciting coil(s) 830, energy corresponding to the induced magnetic field is accumulated in the resonance circuit 841 of the position indicator 84, similarly to the case when the driving coils provided on the driving coil substrate 83 are used. Then, the position indicator 84 supplies the magnetic field energy accumulated in the resonance circuit 841 to the detecting coil substrate 82.

It is noted that although in the embodiments described above, the ITO film is used as the transparent conductive member, it is, of course, possible to use any other suitable transparent conductive material. For example, it is possible to use a transparent conductive member made of a zinc oxide (ZnO) or a transparent conductive ink obtained by mixing a liquid solution with minute silver (Ag) wires. In addition, as described above, the dummy pattern need not be made of the same transparent material as that of the conductive member composing the first transparent electrodes and the second transparent electrodes, and thus the dummy pattern may be made of a transparent material whose light transmittance is either equal or comparable to that of the first transparent electrode and the second transparent electrode. In addition, since the dummy pattern need not be composed of a conductive member, the dummy pattern can be made, for example, of a non-conductive material such as a transparent resin or the like.

In addition, although the above description has been given with respect to the case where the position detecting sensor of the present invention is used in a tablet device, the position detecting sensor of the present invention can also be applied, for example, in a portable terminal such as a cellular phone unit or a mobile personal computer, a stationary-type electronic apparatus, and other various kinds of electronic apparatus.

In addition, although in the embodiments described above, the description has been given with respect to the case where all of the display devices are LCDs, the present invention is by no means limited to the LCD, and the present invention can be applied in various other types of display device, such as an organic electroluminescence display device, in which display pixels are regularly disposed.

The invention claimed is:

1. A position detecting sensor configured to be superposed on a display surface of a display device including plural pixels disposed in a first direction and in a second direction perpendicular to the first direction, the pixel having long edges and short edges, the long edges extending in the first direction and the short edges extending in the second direction, the position detecting sensor being configured to detect a position indicated thereon by an indication body and comprising:
  (a) a grid structure composed of plural electrodes extending in the first direction and each having light permeability, and of plural electrodes extending in the second direction and each having light permeability,
  wherein a rectangular area is formed by four cross-points at which two immediately adjacent electrodes extending in the first direction and two immediately adjacent electrodes extending in the second direction intersect with each other; and
  (b) a dummy pattern having light permeability disposed in the rectangular area proximate to the electrodes, so as to provide uniform optical characteristics for the position detecting sensor, the dummy pattern being disposed to electrically float;
  wherein at least some of the plural electrodes extending in the first direction are shaped to have a set of positive and negative inclinations with respect to the first direction arranged in a series along the first direction, the set being repeated at least twice between two immediately adjacent cross-points along the first direction, to reduce a Moire effect between the plural pixels disposed in the first direction and the plural electrodes extending in the first direction; and
  wherein at least some of the plural electrodes extending in the first direction are each shaped to be line-symmetric about a straight line extending in the first direction.

2. The position detecting sensor according to claim 1, wherein at least some of the plural electrodes extending in the first direction are shaped to each have the set of positive and negative inclinations repeated twice or more, but less than a number of times at which the Moire reduction effect starts to lessen, between two immediately adjacent cross-points along the first direction.

3. The position detecting sensor according to claim 1, wherein the determined inclinations are shaped to have curvature.

4. The position detecting sensor according to claim 1, wherein the dummy pattern is shaped to have a set of positive and negative inclinations with respect to the first direction in correspondence to the shapes of the at least some of the plural electrodes extending in the first direction having the set of positive and negative inclinations.

5. The position detecting sensor according to claim 1, which comprises a capacitive system for detecting a change in a capacitance corresponding to a position indicated on the position detecting sensor by the indication body.

6. The position detecting sensor according to claim 1, which comprises an electromagnetic induction system to detect a position indicated on the position detecting sensor by the indication body.

7. The position detecting sensor according to claim 6, further comprising an exciting coil for supplying an electromagnetic induction signal to the indication body,
  wherein the exciting coil is disposed on a surface opposite to the display surface of the display device or on the display surface of the display device proximate to the position detecting sensor.

8. The position detecting sensor according to claim 1, wherein the plural electrodes extending in the first direction and the plural electrodes extending in the second direction are disposed on a base member having light permeability.

9. The position detecting sensor according to claim 1, wherein the plural electrodes extending in the first direction are located on one surface of a base member having light permeability, and the plural electrodes extending in the second direction are located on another surface of the base member.

10. The position detecting sensor according to claim 1, wherein the dummy pattern has a shape corresponding to at least the shapes of the electrodes extending in the first direction.

11. The position detecting sensor according to claim 1, wherein the dummy pattern is made of the same material as the electrodes.

12. The position detecting sensor according to claim 1, wherein the dummy pattern is composed of plural sub-patterns, and a determined space is formed between adjacent ones of the plural sub-patterns.

13. The position detecting sensor according to claim 12, wherein the plural sub-patterns electrically float from one another.

14. The position detecting sensor according to claim 13, wherein the plural sub-patterns are line-symmetric about a determined straight line or are point-symmetric about a determined point.

15. A position detector comprising:
  a position detecting sensor as defined in claim 1;
  a transmission signal supplying circuit configured to supply determined transmission signals to the plural electrodes extending in the second direction in the position detecting sensor; and
  a signal receiving circuit configured to receive signals from the plural electrodes extending in the first direction in the position detecting sensor.

16. A method of reducing a Moire effect between a display device and a position detecting sensor superposed on one another, wherein the display device includes plural pixels disposed in a first direction and in a second direction perpendicular to the first direction, the pixel having long edges and short edges, the long edges extending in the first direction and the short edges extending in the second direction, and the position detecting sensor includes first longitudinal electrodes extending in the first direction and second longitudinal electrodes extending in the second direction, the method comprising:
  forming a rectangular area, for receiving a dummy pattern, with two immediately adjacent first longitudinal electrodes and two immediately adjacent second longitudinal electrodes that intersect each other at four cross-points corresponding to four corners of the rectangular area, the first and second longitudinal electrodes and the dummy pattern being configured to provide uniform optical characteristics across a surface of the position detecting sensor; and
  configuring at least some of the first longitudinal electrodes extending in the first direction to have a set of positive and negative inclinations with respect to the first direction arranged in a series along the first direction, the set being repeated at least twice between two immediately adjacent cross-points along the first direction.

17. The method according to claim 16, further comprising: configuring the positive and negative inclinations to have curvature.

18. The method according to claim 16, comprising configuring the dummy pattern in a shape having a set of positive and negative inclinations with respect to the first direction in correspondence to the shapes of the first longitudinal electrodes having the set of positive and negative inclinations with respect to the first direction.

19. The method according to claim 18, comprising configuring the dummy pattern with plural sub-patterns that together form the dummy pattern.

20. The method according to claim 16, wherein the pixels of different colors are disposed in the first direction and the pixels of the same color are disposed in the second direction.

* * * * *